| United States Patent [19] | [11] Patent Number: 4,870,137 |
|---|---|
| Lopez et al. | [45] Date of Patent: Sep. 26, 1989 |

[54] NOVEL N-SUBSTITUTED POLYAMIDE TYPE POLYMERS, THEIR METHOD OF PREPARATION AND THEIR USE AS ADDITIVES FOR CRUDE PETROLEUM OILS

[75] Inventors: Denis Lopez, Toulouse; Paul Maldonado, Castanet Tolosan; Gilles Meunier, Mazerolles-Lescar; Luc Navascues, Paris, all of France

[73] Assignee: Societe Nationale ELF Aquitaine, Courbevoie, France

[21] Appl. No.: 2,306

[22] Filed: Jan. 9, 1987

[30] Foreign Application Priority Data

Jan. 10, 1986 [FR] France ................................ 86 00291

[51] Int. Cl.[4] .............................................. C08F 8/32
[52] U.S. Cl. .................................. 525/329.9; 525/380
[58] Field of Search ........................................ 525/329.9

[56] References Cited

U.S. PATENT DOCUMENTS 3,005,784  10/1961  Jones ................................. 525/329.9
4,520,182  5/1985  Turner et al. ..................... 526/307.2

OTHER PUBLICATIONS

"Intrinsic Viscosity–Number Average Molecular Weight Relationship for Poly(N-Octadecyl Acrylate) and Poly(N-N-Octadecy(Acrylamide)", Jordan, Jr. et al., J. Oil Chem. Soc., 43(10), 1966, pp. 563-567.

*Primary Examiner*—Joseph L. Schofer
*Assistant Examiner*—Bernard Lipman
*Attorney, Agent, or Firm*—Burgess, Ryan & Wayne

[57] ABSTRACT

Polymer compounds resulting from the condensation of polyacrylic acids having a molecular weight comprised between 10,000 and 2,000,000 and alkylamines containing at least 12 carbon atoms in their chain. These products constitute paraffin deposit inhibitors and pour point depressants for crude petroleum oils.

2 Claims, No Drawings

NOVEL N-SUBSTITUTED POLYAMIDE TYPE POLYMERS, THEIR METHOD OF PREPARATION AND THEIR USE AS ADDITIVES FOR CRUDE PETROLEUM OILS

FIELD OF THE INVENTION

The present invention relates to novel macromolecular compounds of the N-substituted polyamide type, for utilization especially as paraffin deposit inhibitors and pour point depressants for crude petroleum oils.

BACKGROUND OF THE INVENTION

The prior art, and in particular French Pat. No. 1 575 984 teaches that macromolecular compounds of the type consisting of a main hydrocarbon chain upon which are grafted relatively long straight hydrocarbon chains, i.e. of at least 10 or 12 carbon atoms, can interfere with the crystallization of heavy paraffins.

This property is advantageously utilized in order to improve the stability of paraffin-rich crude oils, either by preventing the formation of scale deposits during the extraction or transportation of crude petroleum oils, or by preventing the accumulation of paraffin crystals in slack areas which thereby limit fluid flow at low temperature.

In macromolecules of molecular weights of at least 10,000 and having lateral chains which are connected to central chain through intermediary functional groups, it appears that the most interesting groups are by far, the ester groups and especially the amide groups.

The preparation of amide linked derivatives can be envisaged by polymerization of N-alkylamide containing monomers of unsaturated carboxylic acids, or by amidation of prepolymerized structures from unsaturated carboxylic acids.

The first method involves the problem of manufacturing unsaturated N-alkylamide containing monomers. Indeed, the reaction that comes to mind is condensation of an unsaturated acid, for example acrylic acid, with a fatty amine.
In practice, this reaction is totally in competition with the Michael reaction and instead of leading to N-acrylamide, alkylaminopropionic acid is obtained. The solutions that are found in the literature are complex, and consist for example, in condensation of an amine with an acrylic acid derivative, 2-carboxymethyl-7-oxa(1,2,2-)bicyclo-5-hexene and dissociation of the amide obtained in acrylamide and furane (EP 104 584), or condensation of the amine on acryloxyl chloride, such as cited in EP 115 703.

The other method encounters another sort of difficulty. The polymerization derivative of the unsaturated carboxylic acid is poorly adapted to the reaction with a long chain amine, due to the incompatibility of the two reactants, polyacrylic acid or homologue, which is of totally hydrophilic nature, and alkylamine which is of totally oleophilic nature. Of course, instead of a carboxylic acid polymer, it is possible to use copolymers, for example, a copolymer of an unsaturated carboxylic acid and an olefin, even a terpolymer of unsaturated monocarboxylic acid, unsaturated $\alpha$-$\beta$-dicarboxylic acid and olefin such as taught by FP 82 09 908. These compounds contain monomers endowed with very different reactivities and the result of the copolymerization is strongly influenced by operating conditions, from which stem uncertainties as to the structure and the reproducibility of the amide-based compounds derived therefrom. But, above all, the molecular weights obtained by these methods are too low, and their amide derivatives function as dispersants of the various particles than can be present in oils, but do not act in syncrystallization with the paraffins which are responsible for undesirably high pour points.

The applicants have found that it is possible to very easily realize N-amide based polymer compounds by reacting, in aqueous heterogeneous medium, a polyacrylic acid and a long chain fatty amine and that the products thus obtained offer a very high activity of paraffin deposit retention and of depression of the pour point in the crudes, that this activity was only very slightly influenced by the origine of the crude, and that the obtention of the products and their remarkable properties was very easy to reproduce.

The principle of obtaining products according to the invention is described herein-below:

The apparently very heterogeneous mixture of polyacrylic acid (APA) in on aqueous solution of fatty amine, preferably aromatic hydrocarbonbased solvent and a dehydratation catalyst is heated without stirring, and the raise in temperature is conducted in such a manner so as to obtain the homogenization of the reaction medium, then both the water carried along by the diluted polyacrylic acid charge and that appearing from the amidation reaction is eliminated by azeotropic stripping.

The polyacrylic acid can be prepared from the polymerization of acrylic acid initiated by a generator of free radicals such as azoisobutyronitrile (AIBN) utilized jointly with a growth limiter of the chains, in the present case, thioglycolic acid (TGA) or again by a redox system such as the potassium persulfate/metabisulfite system. Its molecular weight should be comprised between 5,000 and 500,000 but an acid of 80,000 to 150,000 is preferable, and is perhaps obtained more easily by redox initiation.

The fatty amine will preferably be a long chain monoalkylamine, containing at least 12 carbon atoms, and more particularly $C_{18}$ amines such as alkylamine or stearylamine, and even more preferably $C_{20}/C_{22}$ amines such as erucic amine or behenic amine.

The dehydratation agent is optional but industrial catalysts will advantageously be utilized such as zinc oxide or boric acid. The choice of solvent is not particularly limitative. It is however necessary on the one hand that its water stripping power due to azeotropy be effective and on the other hand that its boiling point not be too low.

Toluene, xylene, industrial aromatic solvents having boiling points lower than 300° C. or mixtures of such solvents are particularly suitable for this purpose. They have the supplementary advantage of being good solvents of macromolecular compounds according to the invention and of being soluble in crude petroleum oils. They can thus constitute the bases of formulations of rheological and anti-deposit additives. Such formulations preferably contain from 20 to 80% by weight of macropolymers according to the invention, depending on the fluidity desired for an application generally carried out by injection in wells or in transport lines.

The preparation of the compounds of the present invention and the effects that can be obtained therefrom as to the improvement of the petroleum crudes will become more apparent from the non-limitative examples given herein-below. In order to facilitate reading, several definitions, measuring principles and usual tests methods in this field are set forth below.

The molecular weights of the polyacrylic acids utilized as intermediaries, or even as raw materials in the preparation of the compounds according to the invention are obtained from intrinsic viscosity values through application of the Mark-Houwink formula:

$$[n] = KM^a$$

The viscosity measurements are taken on polyacrylic acid solutions in NaOH 2M, at 25° C., and the values of the constants are taken from J. Banrup and E. H. Immergut, Polymer Handbook:

$$k = 42.2 \ 10^{-5} \ dl.g^{-1}$$

$$a = 0.64$$

The molecular weights of the condensates according to the invention are determined by chromatography through gel permeation, as being those of polyethylene glycols that present the same chromatographic behaviour.

The paraffins contents of the experimented crudes is measured according to standard techniques of gas phase chromatography.

The pour point of the crudes is measured, according to the standard NFT 60105, but where necessary a dynamic pour test is also carried out. According to this test, the longest distance covered by an oil escaping from a vase through a cooled tube is measured. The oil is contained in a recipient maintained at a temperature of about 10° higher than that of its pour point. This recipient issues by means of a largemouth cock, onto a calibrated glass tube, 40 cm in length, smaller than 3 mm in diameter, and inclined at 5° on the horizontal. This tube is maintained, due to a thermostatic bath at a temperature of 0°, 5°, 10° or 15° -the choice of this temperature depening upon the performances of the oil and of the inhibitor subjected to the test. The initial level of the oil in the banking is relatively unimportant. Care has simply to be taken that it is maintained constant from one comparative test to another; in practice, the banking is charged with a constant volume of oil (for example 10 ml). The measurement is made by reading the maximum distance covered in the cooled tube prior to its solidification.

Furthermore, the aptitude of an additive to limit the formation of the paraffin deposit is measured by means of a test called plate test, which consists in circulating a crude, maintained at constant temperature, tangentially to two plates maintained at a different constant temperature to that of the crude, and which in any case is chosen lower than that of the starting crystallization temperature of the crude paraffins, itself determined, for example, by differential calorimetric analysis. After a certain period, the deposit formed is collected, weighed and possibly analyzed.

EXAMPLE 1

A polyacrylic acid having a low molecular weight is prepared by reaction of:

| acrylic acid | 600 parts |
| --- | --- |
| azoisobutyronitrile | 3 parts |
| thioglycolic acid | 16 parts |
| water | 3,430 parts |

Through heating during 4 hours at 85° C. an aqueous solution of a polyacrylic acid is thus obtained the molecular weight of which is about 14,000.

This acid is thereafter condensed with a fatty monoamine comprising about 22 carbon atoms. Here, industrial behenylamine, commercially available from the company CECA SA under the name Noram 42 ® and characterized by an alkalinity of 3.2-3.4 milliequivalents per gram is used. In order to carry out this condensation reaction, to the preceding solution of polyacrylic acid is added 422 parts at 14.5% dry extract, 320 parts of Solvesso 200 ® (commercial aromatic solvent, having a boiling point comprised between 220° and 292° C.), and 3 parts of zinc oxide acting as dehydratation catalyst. The temperature is raised to 60° and into the mixture is introduced 255 parts of Noram 42 ®. The temperature is progressively raised up to 240°, with continuous elimination of water brought by the polyacrylic acid or formed during the condensation reaction. When the solvent no longer carries along water, the heating is continued a further 10 minutes. A hydrocarbon-based solution containing 50% active material is thus obtained constituted by a polymer of which the molecular weight is comprised between 2,000 and 9,000.

EXAMPLE 2

A polyacrylic acid having a relatively high molecular weight is prepared by reaction of:

| acrylic acid (aqueous solution at 60%) | 123 parts |
| --- | --- |
| water | 186 parts |
| potassium persulfate | 1.4 parts |
| potassium metabisulfite | 0.7 parts | through heating for 1 hour at 55° C. An aqueous solution at 2% of a polyacrylic acid of which the molecular weight is about 120,000 is thus obtained.

As in example 1, the amidation of this polyacid is carried out by means of Noram 42 ®, the quantities of the reaction agents are the following:

| polyacrylic acid (the preceding aqueous solution diluted at 20% of active material) | 332 parts |
| --- | --- |
| Noram 42 ® | 300 parts |
| ZnO | 4 parts |

A hydrocarbon-based solution at 50% of active material is thus obtained constituted by a polymer of which the molecular weight is comprised between 20,000 and 30,000.

EXAMPLES 3 AND 4

Operating proceeds as in example 1, while changing the quantities of azoisobutyronitrile and thioglycolic acid in order to vary the molecular wieghts. For example the following results are obtained:

| Test | IBNA | TGA | Molecular weight of APA | Molecular weight of the condensate |
|---|---|---|---|---|
| 3 | 1 | 16 | $120.10^3$ | $30.10^3$ |
| 4 | 3 | 8 | $30.10^3$ | $15.10^3$ |

EXAMPLES 5 TO 8

Operating proceeds as in Example 2 with the polymerization of the acrylic acid by the persulfate/metabisulfate redox system, the condensation conditions of the behenic amine being caused to vary. The following results are obtained:

| Test | T° of polymerization of acrylic acid | Molar weight of APA | Dehydratation catalyst | Duration of post-heating at 250° | Mol. weight of condensate |
|---|---|---|---|---|---|
| 5 | 55° | $120.10^3$ | $BO_3H_3$ | 6 hours | $26.10^3$ |
| 6 | 50° | $90.10^3$ | $BO_3H_3$ | 6 hours | $9.10^3$ |
| 7 | 50° | $90.10^3$ | $BO_3H_3$ | 10 min. | $7.10^3$ |
| 8 | 65° | $600.10^3$ | ZnO | 10 min. | $47.10^3$ |

EXAMPLE 9

Operation starts with a commercially available polyacrylic acid having a very low molecular weight (6,000). The amidation conditions are those prevailing in example 1. An amide-based polymer is obtained having a molecular weight close to 5,000.

EXAMPLE 10 TO 12

The polyacrylic acid being that of example 2, the subsequent condensation is performed under the same conditions with industrial stearylamine, a distearylamine and a behenylpropylenediamine, respectively commercialized by the company CECA S.A. under the names Noram S ®, Noram 2-18 ® and Dinoram 42 ®. The following condensation products are obtained that can be characterized by their molecular weight:

| Product n° | TYPE | Molar weight |
|---|---|---|
| 10 | Polystearylacrylamide | 40,000 |
| 11 | Polydioctadecylacrylamide | 22,000 |
| 12 | Polybehenylaminopropylacrylamide | 15,000 |

EXAMPLE 13

The effectiveness of the products according to the invention as additives improving the pour properties of a paraffinic crude oil is determined, the said crude oil being characterized by its content in paraffin comprised between 20 to 25%, and its viscosity from $8.4 \, 10^{-6} \, m^2/s$ at 50° and of $5.0 \, 10^{-6} \, m^2/s$ at 60°. The test is carried out according to the standard NFT 60105, the oil being doped by the addition of 600 ppm of inhibitors. The products according to the invention are compared with two commercially available products, $C_1$ which is a $C_{20/22}$ alcohol acrylate homopolymer and $C_2$ which is a $C_{20/22}$ alcohol acrylate copolymer and maleic anhydride, at a regular dosing of 600 ppm.

| Additive utilized | Pour point °C. |
|---|---|
| control - no additive | 30° |
| product according to example 3 | 12° |
| product according to example 5 | 9° |
| product according to example 7 | 9° |
| product according to example 9 | 30° |
| product $C_1$ | 15° |
| product $C_2$ | 15° |

EXAMPLE 14

The effectiveness of the products according to the invention as additives improving the flow properties of a paraffinic crude oil of which the paraffins content is 22% and the pour point 26° C. is determined. The quantities of inhibitors in this example are 600 and 2,000 ppm.

| | Pour point | |
|---|---|---|
| Additive | Inhibitor 600 ppm | Inhibitor 2,000 ppm |
| Product according to example 5 | 15° C. | 6° C. |
| Product according to example 7 | 15° C. | 6° C. |
| Product according to example 12 | 27° C. | 27° C. |
| Sample | | 27° C. |

EXAMPLE 15

The effectiveness of the products according to the invention as additives for improving the pour properties of crudes oils according to the dynamic flow test is determined.

In this example, is used a crude oil titrating 27.5% of paraffins, the pour point of which is 27° C. A control test, according to the operating method proposed shows that the route is nil in a tube cooled to 10°. The product $C_1$ of example 13 is taken as the element of comparisons. The tests are conducted with 1,000 ppm of additive.

| | Maximum route in C⁻ | |
|---|---|---|
| Additive | T° of test 10° | T° of test 5° |
| Control | solidified | solidified |
| Product according to example 5 | permanent pour | >40 |
| Product according to example 6 | permanent pour | >40 |
| Product according to example 7 | permanent pour | 32 |
| Product according to example 13 | 25 | solidified |

EXAMPLE 16

The example shows the specificity of the products obtained from a long chain monoamine chain.

The effectiveness of the products is determined according to standard NFT 60105 by measuring the pour point of the crude oil in example 13, with additive quantities of 600 ppm.

The results compiled in the table here-under confirm the very great effectiveness of polybehenylacrylamide:

| Product | Pour point |
|---|---|
| according to example 5 | 9° C. |
| according to example 10 | 12° C. |
| according to example 11 | 30° C. |

-continued

| Product | Pour point |
| --- | --- |
| according to example 12 | 30° C. |

EXAMPLE 17

The paraffin anti-deposit effectiveness of a product according to the invention is shown in a plate test conducted on a crude characterized by a paraffin content of 8.5%, of which the starting crystallization temperature is 22°: the test was carried out on plates maintained at 20° during 17 hours. The test is performed with 300 ppm of additives, the comparison product DAAM, being an amine-based derivative of an acrylic acid/maleic anhydride copolymer modified by a fatty amine and a fatty alcohol.

| Additive | Deposit (in grams) |
| --- | --- |
| control | 1.01 |
| according to the invention ex. 7 | 0.37 |
| DAAM | 0.54 |

The analysis of the deposits formed shows furthermore that in case of virgin crude they are constituted of paraffins of which 40% by weight have a molecular weight higher than 350 (25 carbons atoms or more), against 33% in case of a crude treated with the DAAM product and 10% for the crude containing the compound according to example 7, and thus, not only does this compound quantitatively limit such a deposit, but also it reduces the scaling power by reducing its very heavy paraffin content.

We claim:

1. Macromolecular N-substituted polyamides resulting from the condensation in a heterogeneous medium of a polyacrylic acid in the form of an aqueous solution, and a hydrocarbon-based long fatty amine having from 20–22 carbon atoms.

2. An N-substituted polyamide according to claim 1, wherein the polyacrylic acid has a molecular weight between 10,000 and 200,000.

* * * * *